United States Patent
Lee et al.

(10) Patent No.: US 7,307,398 B2
(45) Date of Patent: Dec. 11, 2007

(54) IMAGE PROCESSING DEVICE AND METHOD FOR CONTROLLING A MOTOR SYSTEM

(75) Inventors: Chun-Jen Lee, Taipei Hsien (TW); Yueh-Chi Hung, Taipei Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 337 days.

(21) Appl. No.: 10/906,975

(22) Filed: Mar. 15, 2005

(65) Prior Publication Data
US 2005/0206963 A1  Sep. 22, 2005

(30) Foreign Application Priority Data
Mar. 18, 2004  (TW)  .............................. 93107271 A

(51) Int. Cl.
*G05B 19/40* (2006.01)
(52) U.S. Cl. ...................................................... 318/685
(58) Field of Classification Search ..................... None
See application file for complete search history.

(56) References Cited

U.S. PATENT DOCUMENTS 5,109,233 A * 4/1992 Nishikawa .................... 347/12
6,984,955 B2 * 1/2006 Akiyama .................... 318/650

* cited by examiner

*Primary Examiner*—Lincoln Donovan
*Assistant Examiner*—Erick Glass
(74) *Attorney, Agent, or Firm*—Winston Hsu

(57) ABSTRACT

A image processing device includes a first module, a motor system connected to the first module and capable of pushing the first module to move forward, a selector connected to a plurality of loading circuits included in the motor system and capable of selecting a loading circuit among the plurality of loading circuits and setting the selected loading circuit as a loading of the motor system, and a controller electrically connected to a driver included in the motor system and capable of controlling a speed of the motor system pushing the first module.

12 Claims, 4 Drawing Sheets

IMAGE PROCESSING DEVICE AND METHOD FOR CONTROLLING A MOTOR SYSTEM

BACKGROUND OF INVENTION

1. Field of the Invention

The present invention relates to an image processing device, and more particularly, to an image processing device selecting a loading circuit among a plurality of loading circuits according to a speed of a first module.

2. Description of the Prior Art

Image processing devices, such as computer printing devices, photocopiers, scanners and multi-functional peripherals (MFP) are broadly applied nowadays. The request of the resolution of the scanning modules of the image processing devices is increasing, and the choices of resolutions are various. The speed of the motor pushing the scanning module of the scanner or the multi-functional peripheral may be decided according to the resolution of scanning and the amount of data to be scanned.

Please refer to FIG. 1. FIG. 1 is a block diagram of a prior art image processing device. 100 is a conventional image processing device, which may be a multi-functional peripheral or a scanner. 110 is a scanning module of the image processing device 100. 120 is a motor system electrically connected to the scanning module 110 and capable of pushing the scanning module 110 to move forward. The motor system 120 includes a power supply 122, a loading circuit 124, a motor 126 and a driver 128, wherein the driver 128 is utilized to drive the motor 126. 130 is a controller electrically connected to the driver 128 and capable of controlling a speed of the motor 126 pushing the scanning module 110 forward. For example, when the image processing device 100 of the prior art scans the document with a low resolution, the motor 126 pushes the scanning module 110 to move forward at a higher speed for the amount of data is small. The controller 130 accordingly commands the driver 128 to control the motor 126 pushing the scanning module 110 to move forward at a high speed. When scanning documents with a high resolution, the motor 126 needs to push the scanning module 110 to move forward at a low speed for the amount of data is large. The controller 130 accordingly commands the driver 128 to control the motor 126 pushing the scanning module 110 to move forward slowly. Furthermore, when the multi-functional peripheral is switched to copy mode, the speed of the motor is set in accordance with the speed of the printing module. When copying with a low resolution, for example, printing documents in a sketch mode, the scanning module scans faster because fewer data is extracted. Accordingly, the speed of the motor may be faster. On the contrary, when copying with a higher resolution, for example, when printing photos, the scanning module scans faster because the amount of extracted data is huge. Accordingly, the speed of the motor should be higher. When scanning slowly, the motor does not need much power to push the scanning module. Contrarily, when scanning fast, the motor needs more power to maintain the operation of the system. However, in the conventional image processing device 100, the loading circuit by which the motor system 120 controls the power provided by the power supply 122 to the motor 126 is fixed to the loading circuit 124. Accordingly, the input power of the motor system has to be designed to meet the requirement of the mode of the highest scanning speed, that is, to meet the maximum required power. That means, the loading circuit 124 is designed to make the power provided by the power supply 122 to the motor 126 a maximum power that is ever needed. However, when the motor system scans documents at a lower speed, there will be excess power. The excess power will be transferred into heat and makes the motor hot, which damages the motor system gradually and easily.

SUMMARY OF INVENTION

It is therefore a primary objective of the claimed invention to provide an image processing device having a plurality of loading circuits among which a loading circuit can selected and set as a loading of a motor system of the image processing device to control the power provided to the motor.

Briefly described, the claimed invention discloses an image processing device. The image processing device includes a first module, a motor system connected to the first module and capable of pushing the first module to move forward, a selector connected to a plurality of loading circuits included in the motor system and capable of selecting a loading circuit among the plurality of loading circuits and setting the selected loading circuit as a loading of the motor system, and a controller electrically connected to a driver included in the motor system and capable of controlling a speed of the motor system pushing the first module.

The claimed invention further discloses a method for controlling a motor system included in an image processing device, wherein the image processing device includes a first module and a motor system electrically connected to the first module, wherein the motor system includes a plurality of loading circuits. The method includes selecting a loading circuit among the plurality of loading circuits and setting the selected loading circuit as a loading of the motor system for controlling power provided to the motor system.

It is an advantage of the claimed invention that the loading of the motor system included in the image processing device is selectable. In the claimed invention, the loading circuit of the motor system may be selected and set according to the needed input power of the motor system included in the image processing device.

DETAILED DESCRIPTION

Figure 1:
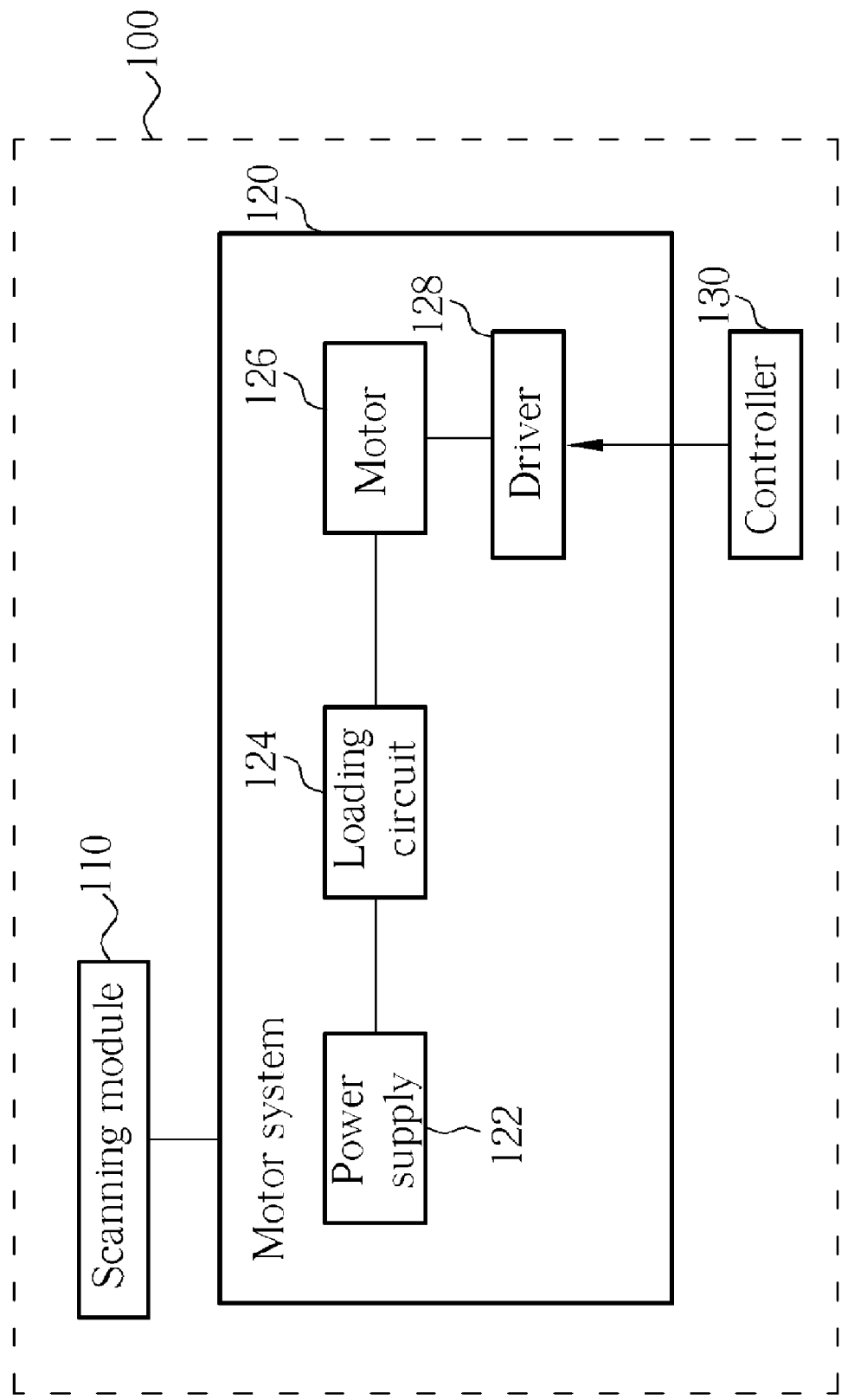
FIG. 1 is a block diagram of a prior art image processing device.
Figure 2:
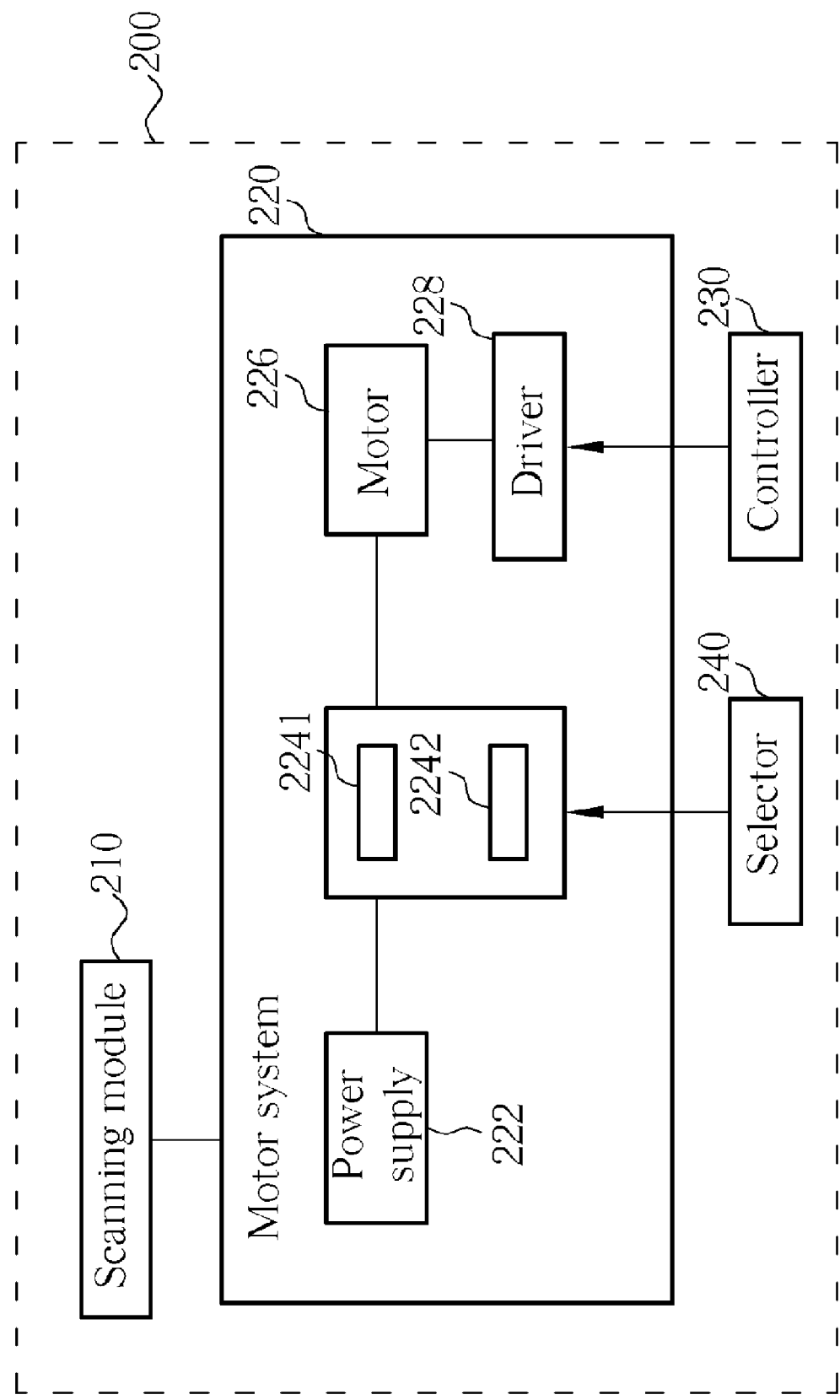
FIG. 2 is a block diagram of a first embodiment of the present invention image processing device.

Please refer to FIG. 2. FIG. 2 is a block diagram of a first embodiment of the present invention image processing device. 200 is a present image processing device, which may be a multi-functional peripheral or a scanner. 210 is a scanning module of the image processing device 200. 220 is a motor system electrically connected to the scanning module 210 and capable of pushing the scanning module 210 to move forward. The motor system 220 includes a power supply 222, a loading circuit 2241 and a loading circuit 2242, a motor 226 and a driver 228, wherein the motor 226 may be a stepping motor, and the driver 228 is utilized to drive the motor 226 and control the speed of the motor 226. The driver 228 may include a Darlington circuit. 230 is a controller electrically connected to the driver 228 and capable of commanding the driver 228 to control a speed of the motor 226 pushing the scanning module 210. The most significant difference between the present image processing device and the conventional one is there is a plurality of loading circuits included in the motor system 220 in the present image processing device 200. The present image processing device 200 further includes a selector 240 electrically connected to the loading circuit 2241 and the loading circuit 2242. The selector 240 is capable of selecting a loading circuit from the two loading circuits and setting the selected loading circuit as a loading of the motor 226. This way, the motor 226 of the present invention is capable of having different input power by adopting different loading circuits. Assume the loading of the loading circuit 2241 is larger than that of the loading circuit 2242. For example, when the present image processing device 200 scans a document with a high resolution, the motor 226 needs to push the scanning module 210 at a slower speed, and no excess power is expected. The selector 240 selects the loading circuit 2241, the loading of which is larger, and sets the loading circuit 2241 as the loading circuit of the motor 226 while the controller 230 commands the driver 228 to control the speed of the motor 226 to accord with the requirement of the selected resolution. Therefore, the power supply 222 provides less input power to the motor 226, and no power will be left over and transferred into heat. In the contrary, when the image processing device 200 scans the document with a low resolution, not only the controller 230 commands the driver 228 to control the motor 226 pushes at a higher speed, but also the selector 240 selects the loading circuit 2242, the loading of which is smaller, and sets the loading circuit 2242 as the loading circuit of the motor 226. Accordingly, the power provided by the power supply 222 is sufficient for the motor system 220 pushing the scanning module at the expected speed.

Figure 3:
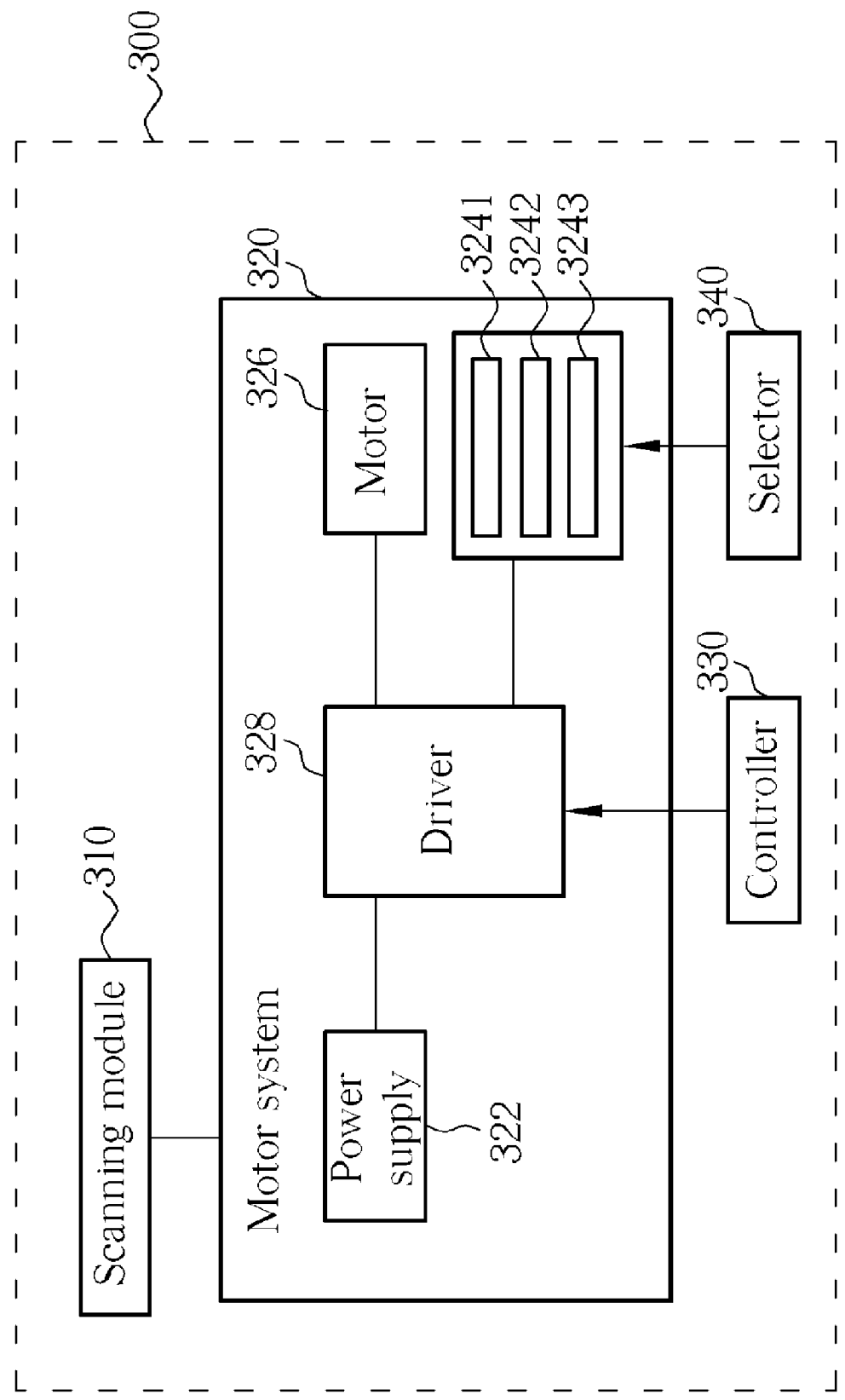
FIG. 3 is a block diagram of a second embodiment of the present invention image processing device.

Please refer to FIG. 3. FIG. 3 is a block diagram of a second embodiment of the present invention image processing device. 300 is an image processing device of the present invention, which may be a multi-functional peripherals or a printer. 310 is a scanning module included in the image processing device 300. 320 is a motor system electrically connected to the scanning module 310 and capable of pushing the scanning module 310 to move forward. The motor system 320 includes a power supply 322, three loading circuits, a motor 326 and a driver 328, wherein the driver 328 is utilized to control the speed of the motor 326. 330 is a controller electrically connected to the driver 328 and capable of commanding the driver 328 to control a speed of the motor 326 pushing the scanning module 310. The three loading circuits included in the image processing device 300 of the present embodiment are loading circuit 3241, loading circuit 3242 and loading circuit 3243. The selector 340 is capable of selecting a loading circuit among the three loading circuits and setting the selected loading circuit as the loading of the driver 328. The driver 328 is capable of having different input power by adopting different loading circuits. The driver 328 controls the input power and the speed of the motor 326 according to its input power consequently. Assume the loading of the loading circuit 3241 is larger than that of the loading circuit 3242, and the loading of the loading circuit 3242 is larger than that of the loading circuit 3243. For example, when the present image processing device 300 prints a document at a highest speed, the motor 326 needs to push the scanning module 310 at the highest speed correspondingly. Therefore, not only the controller 330 commands the driver 328 to control the motor 326 pushing the scanning module 310 at the highest speed, but also the selector 340 selects the loading circuit 3243, the loading of which is the smallest among the three loading circuits, and sets the loading circuit 3243 as the loading circuit of the driver 328. The power provided to the driver 328 by the power supply 322 is the maximum this way. In the contrary, when the image processing device 300 prints the document with a highest resolution, the selector 340 selects the loading circuit 3241, the loading of which is the largest among the three loading circuits, and sets the loading circuit 3241 as the loading circuit of the driver 328 while the controller 330 commands the driver 328 to control the motor 326 pushing at a lowest speed. Accordingly, the power provided to the driver 328 by the power supply 322 is the minimum but sufficient, and no excess power is left and transferred into heat.

Figure 4:
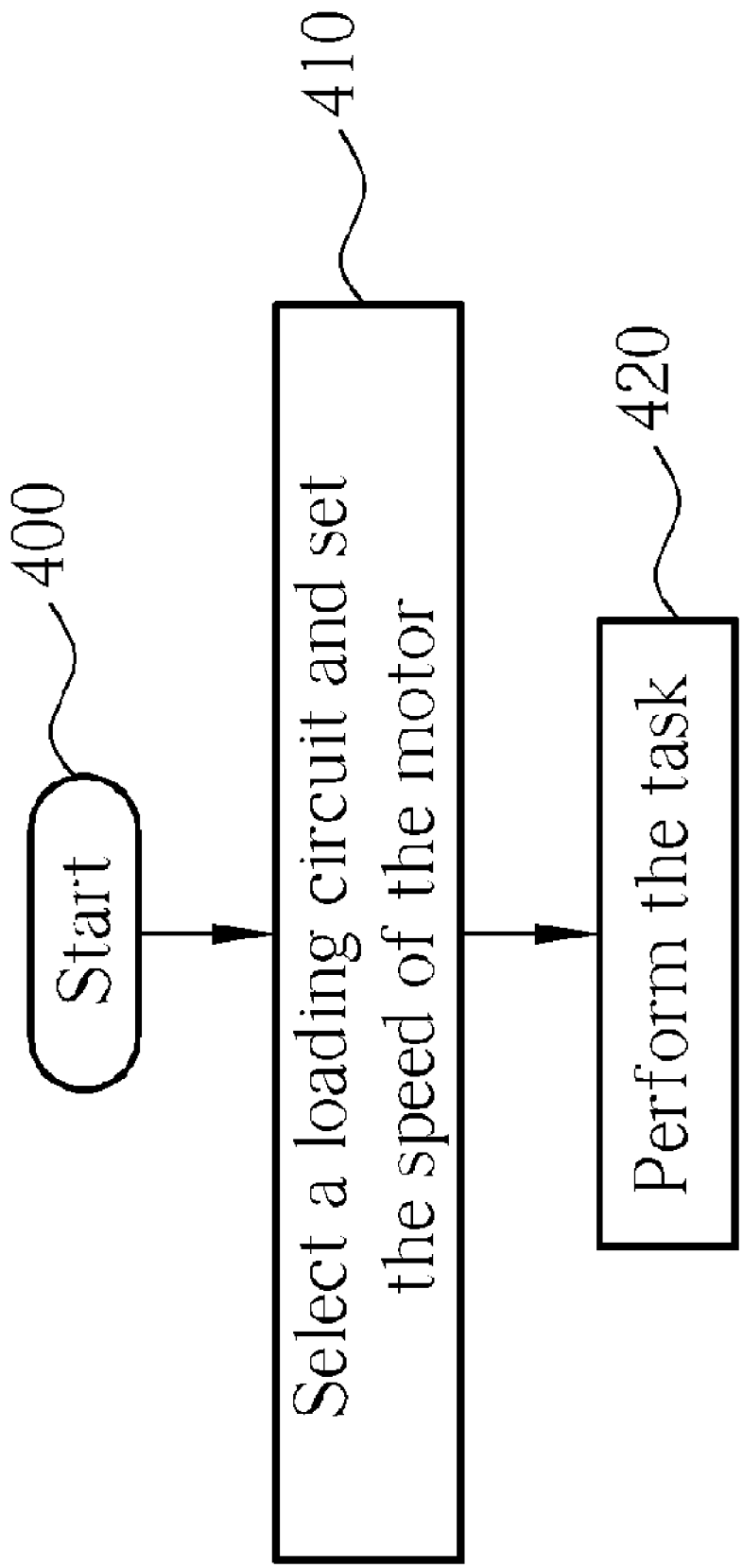
FIG. 4 is a flowchart of the present invention image processing device controlling the motor system.

Please refer to FIG. 4. FIG. 4 is a flowchart of the present invention image processing device controlling the motor system.

Step 400: Start;

Step 410: Select a loading circuit among a plurality of loading circuits according to a setting of a first module, set the selected loading circuit as a loading of the motor system, and set a speed of a motor pushing the first module;

Step 420: Perform the task of the first module.

In the steps illustrated in FIG. 4, the first module may be a scanning module, the setting of the first module is the speed or the resolution of scanning, and the task of the first module is scanning a document. In the other case, the first module can be a printing module, then the setting of the first module is the speed or the resolution of printing, and the task of the first module is printing a document.

The image processing device of the present invention may be a multi-functional peripherals, a printer, a copy machine, a scanner, or a combination of a computer and at least one aforementioned machine. The present method for controlling the motor system may be designed to comprise selecting a loading circuit among different loading circuits according to the resolution or the speed of scanning or printing. This way, the power provided to the motor is sufficient but there will be no excess power. Therefore the flaw in the prior art that the excess power is transferred into heat and causes damage to the relative elements is modified. The rules of selecting loading circuits according to the speed of scanning or printing can be stored in an embedded memory of the multi-functional peripherals, the printer, the copy machine or the scanner. The rules can also be stored in a memory of the computer that is connected to the above machine.

In summery, the present invention discloses an image processing device and the related controlling method. The claimed invention is capable of providing adequate power to the motor system at different speeds and with different resolutions. The image processing device and related controlling method of the present invention avoid the problem of the elements being damaged by the excess input power of the motor system when the machine is performed at a low speed or with a high resolution. Therefore the usage span of the related elements is not shortened.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image processing device comprising:

a first module;

a motor system connected to the first module and capable of pushing the first module to move forward, comprising:
- a motor;
- a driver for driving the motor;
- a plurality of loading circuits; and
- a power supply for providing power to the motor and the driver;

a selector connected to the plurality of loading circuits and capable of selecting a loading circuit among the plurality of loading circuits and setting the selected loading circuit as a loading of the motor system; and a controller electrically connected to the driver and capable of controlling a speed of the motor system pushing the first module.

2. The image processing device of claim 1 wherein the first module is a scanning module for scanning an image.

3. The image processing device of claim 1 wherein the first module is a printing module for printing a document.

4. The image processing device of claim 1 wherein when one of the plurality of loading circuits is selected, the selected loading circuit is set as a loading of the driver.

5. The image processing device of claim 1 wherein when one of the plurality of loading circuits is selected, the selected loading circuit is set as a loading of the motor.

6. The image processing device of claim 1 wherein the motor is a stepping motor.

7. The image processing device of claim 1 wherein the driver is a Darlington circuit.

8. A method for controlling a motor system of an image processing device, wherein the image processing device comprises a first module and a motor system electrically connected to the first module, wherein the motor system comprises a plurality of loading circuits, the method comprising:

selecting a loading circuit among the plurality of loading circuits and setting the selected loading circuit as a loading of the motor system for controlling power provided to the motor system.

9. The method of claim 8 wherein the first module is a scanning module.

10. The method of claim 8 wherein the first module is a printing module.

11. The method of claim 8 wherein the loading circuit is selected among the plurality of loading circuits according to a speed of the first module.

12. The method of claim 8 wherein the loading circuit is selected among the plurality of loading circuits according to a resolution set by the image processing device.

* * * * *